April 15, 1958  C. MITCHELL ET AL  2,830,489
VARIABLE RESOLUTION VOLTAGE CONTROLLABLE INTERFEROMETER
Filed April 11, 1955
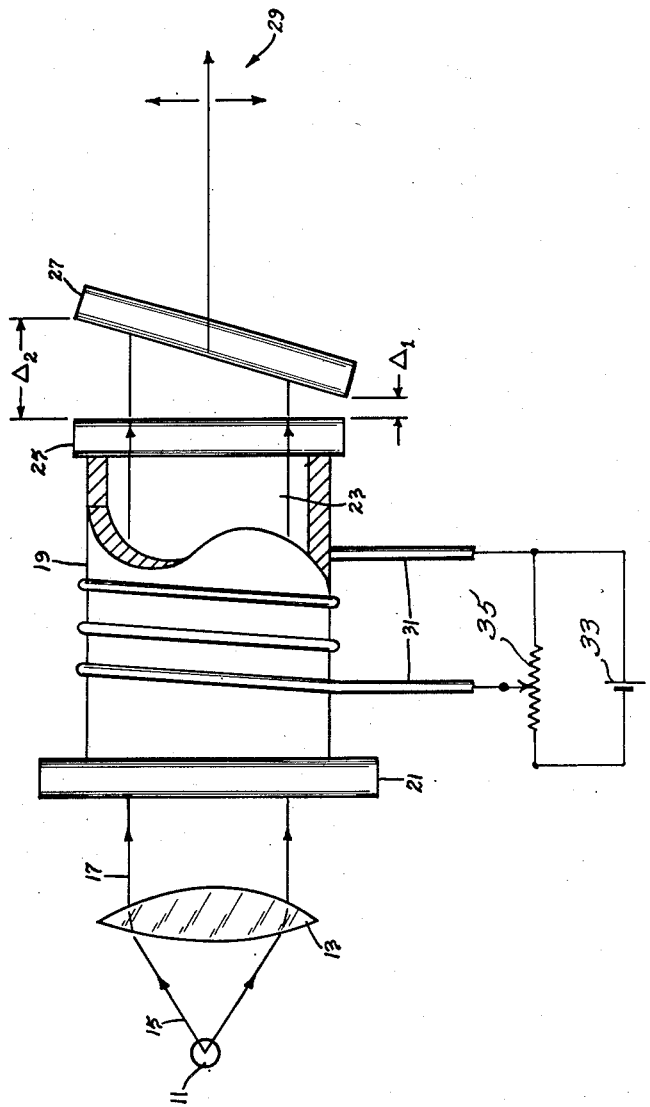
INVENTORS
CLAYBOURNE MITCHELL
RICHARD BLYTHE
ATTORNEYS

United States Patent Office 2,830,489
Patented Apr. 15, 1958

2,830,489

VARIABLE RESOLUTION VOLTAGE CONTROLLABLE INTERFEROMETER

Claybourne Mitchell, Inkster, and Richard Blythe, Ypsilanti, Mich., assignors, by mesne assignments, to the United States of America as represented by the Secretary of the Navy Application April 11, 1955, Serial No. 500,709

1 Claim. (Cl. 88—14)

This invention relates to improvements in spectrometers, and more particularly pertains to improvements in variable resolution interferometers.

Devices heretofore employed for automatic spectroscopy have used the mechanical motion of the optical dispersion element or have used multiple detectors, one for each line being sought. However, such means have failed to provide optimum speed, the required simplicity of detector components or the simple automatization techniques that are desiderata. Mechanical motion is slow, and it is inordinately difficult to keep multiple deflectors with amplifiers in exact balance.

The subject device provides an interferometer capable of shifting the position of the radiation passing through it in accordance with changes in value of an electrical signal. Thus, by sweeping the electrical signal through designated values, the wavelength of radiation at a detector is controlled and speedy, simple automatized spectroscopy is made possible.

The principal object of this invention is to provide means for automatization of interference spectrometry.

Another object is to provide a speedy, simple interferometer capable of shifting the position of the radiation passing through it in accordance with an electrical signal, so that, by sweeping the electrical signal through designated values, the wavelength of radiation at a detector is controlled and automatic spectroscopy is made possible.

Other objects and many of the attendant advantages of this invention will be readily appreciated as the same becomes better understood by reference to the following detailed description when considered in connection with the accompanying drawings wherein the single figure is a schematic diagram of a variable resolution magnetostrictive interferometer, showing a preferred embodiment of the invention.

Light from a suitable source, such as spectroscopic arc 11, is passed through a collimating lens 13, which transforms the divergent beam 15 to a parallel beam 17. The parallel beam 17 enters a magnetostrictive element 19 through the base 21 thereof, and such beam 17 passes successively through the hollow body portion 23, through a first high reflectance interferometer plate 25 secured to the end of element 19 opposite base 21, and through a second high reflectance interferometer plate 27 tilted at a small angle from the orientation of the first plate 25. Said second plate 27 is separated a distance $\Delta_1$ from plate 25 at one extremity, said distance $\Delta_1$ being preferably of the order of a few half wavelengths, and said second plate 27 is separated a distance $\Delta_2$ from plate 25 at the diametrically opposite extremity, $\Delta_2$ being greater than $\Delta_1$ to provide the tilted relationship. Thus, spectral lines 29 appear at a position determined by the separation and relative tilt of the plates 25 and 27 and the wavelength. These lines 29 can be made to shift position sidewise by energizing driving coil 31, which is wound upon element 19, to magnetostrictively vary the separation of the plates 25 and 27. Thus a detector at any given position in the output beam can be subjected to any spectral line present in the source by changing the electrical energy supplied to the magnetostrictive element 19. This electrical energy may be supplied, for example by a source of D. C. voltage 33, such as a dry cell, in series with a potentiometer 35.

Obviously many modifications and variations of the present invention are possible in the light of the above teachings. It is therefore to be understood that within the scope of the appended claim the invention may be practiced otherwise than as specifically described.

We claim:

An interferometer device to be used in conjunction with a source of light comprising, in combination: an interferometer having at least two interference plates, one spaced from the other; and a magnetostrictive control unit, including a tubular magnetostrictive element directly affixed to one said interference plate, and a coil through which a current may be passed to magnetostrictively vary a dimension of said magnetostrictive element and consequently the space between said interference plates, the light from said source communicating with said interference plates by means of the tubular cavity in said control element.

References Cited in the file of this patent

UNITED STATES PATENTS

| | | |
|---|---|---|
| 2,312,888 | Everest | Mar. 2, 1943 |
| 2,534,846 | Ambrose et al. | Dec. 19, 1950 |
| 2,627,202 | Strong et al. | Feb. 3, 1953 |
| 2,708,389 | Kavanagh | May 17, 1955 |